(12) United States Patent
Smith

(10) Patent No.: US 6,802,525 B2
(45) Date of Patent: Oct. 12, 2004

(54) PIVOTAL HANDLE FOR A FOOD SERVICE TABLE

(75) Inventor: Kenneth R. Smith, Atlantic City, NJ (US)

(73) Assignee: Sico Incorporated, Edina, MN (US)

( * ) Notice: Subject to any disclaimer, the term of this patent is extended or adjusted under 35 U.S.C. 154(b) by 273 days.

(21) Appl. No.: 09/950,535

(22) Filed: Sep. 13, 2001

(65) Prior Publication Data

US 2003/0047914 A1 Mar. 13, 2003

(51) Int. Cl.$^7$ ................................................ B62B 3/02
(52) U.S. Cl. ........................... 280/659; 280/47.34
(58) Field of Search ............................ 280/651, 655, 280/655.1, 659, 87.01, 47.17, 47.18, 47.26, 47.31, 47.315, 47.371; 16/429, 436, 438; 108/67, 50.011, 50.16

(56) References Cited

U.S. PATENT DOCUMENTS

| | | | | |
|---|---|---|---|---|
| 1,582,045 A | * | 4/1926 | Don Howe | 280/47.371 |
| 1,828,248 A | * | 10/1931 | Hallowell et al. | 144/285 |
| 2,571,442 A | * | 10/1951 | Griffith | 220/9.2 |
| 2,603,500 A | * | 7/1952 | Messier | 108/77 |
| 3,203,707 A | * | 8/1965 | Anderson | 15/49.1 |
| 3,649,997 A | * | 3/1972 | Thorud | 16/437 |
| 3,816,873 A | * | 6/1974 | Thorud et al. | 16/437 |
| 3,920,259 A | * | 11/1975 | Graham | 280/47.34 |
| 4,160,557 A | * | 7/1979 | Taylor | 248/98 |
| 4,362,308 A | * | 12/1982 | Hicks et al. | 280/30 |
| 4,581,902 A | * | 4/1986 | Starck et al. | 190/11 |
| 4,724,681 A | * | 2/1988 | Bartholomew et al. | 190/18 A |
| 4,796,909 A | | 1/1989 | Kirkendall | |
| 4,846,493 A | * | 7/1989 | Mason | 190/18 A |
| 4,856,810 A | * | 8/1989 | Smith | 280/639 |
| 4,875,696 A | * | 10/1989 | Welch et al. | 188/1.12 |
| 5,183,372 A | | 2/1993 | Dinverno | |
| 5,299,826 A | * | 4/1994 | Flowers | 16/113.1 |
| 5,423,651 A | | 6/1995 | Dinverno | |
| 5,431,298 A | | 7/1995 | Ahn et al. | |
| 5,562,300 A | * | 10/1996 | Nelson | 280/47.38 |
| 5,593,174 A | * | 1/1997 | Graziano et al. | 280/47.38 |
| 5,628,522 A | | 5/1997 | Hall | |
| 5,687,978 A | * | 11/1997 | Rhodes et al. | 280/30 |
| 5,692,761 A | * | 12/1997 | Havlovitz | 280/33.994 |
| 5,876,047 A | * | 3/1999 | Dennis | 280/47.35 |
| 6,010,145 A | * | 1/2000 | Liu | 280/655.1 |
| 6,354,611 B1 | * | 3/2002 | Mihalic et al. | 280/30 |

* cited by examiner

*Primary Examiner*—Christopher P. Ellis
*Assistant Examiner*—Bridget Avery
(74) *Attorney, Agent, or Firm*—Merchant & Gould PC

(57) ABSTRACT

A pivotal handle for a food service table is disclosed. The handle includes two elongated, parallel curved bar members. Each member has an outwardly extending arm and an outwardly extending leg. The legs have means for pivotably attaching the handle to the underside of the table. In its operative position, the handle is pivoted upwardly so that the arms are located above the top of the table. Locking means such as a quick release pin is inserted into an opening formed in the leg which locks the handle in place. When the table is ready to be used as a dining table or to be stored, the pin is removed so that the handle may now be rotated downwardly and stored under the table. A spring clip may be attached to the underside of the table which secures the handle in place when the handle is in the stored position.

5 Claims, 3 Drawing Sheets

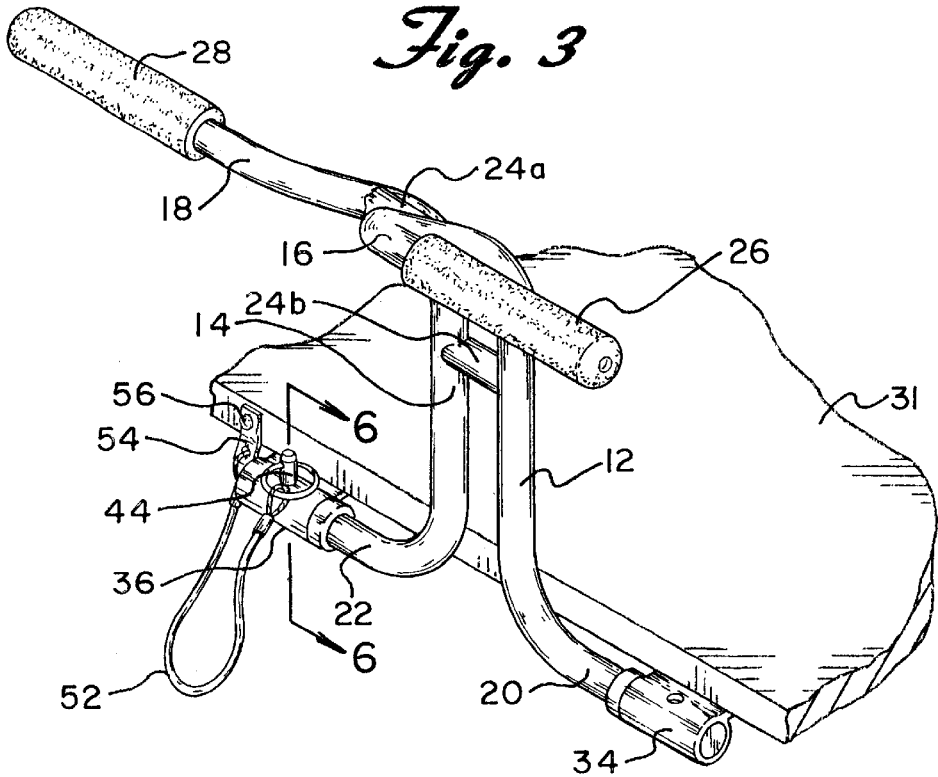
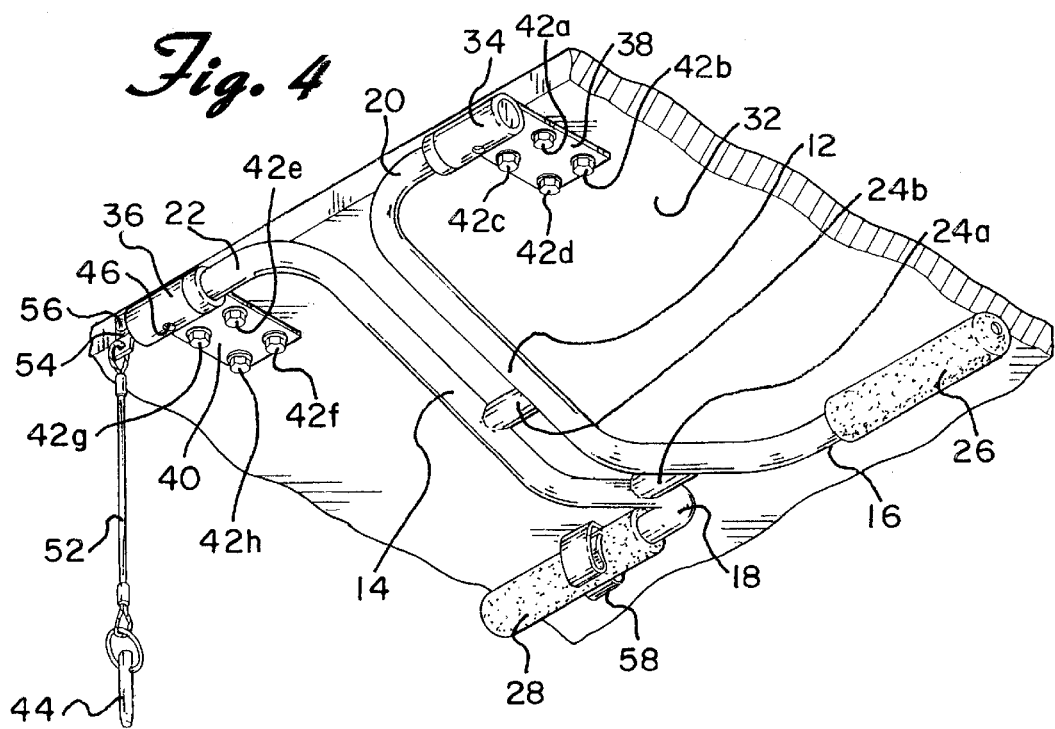

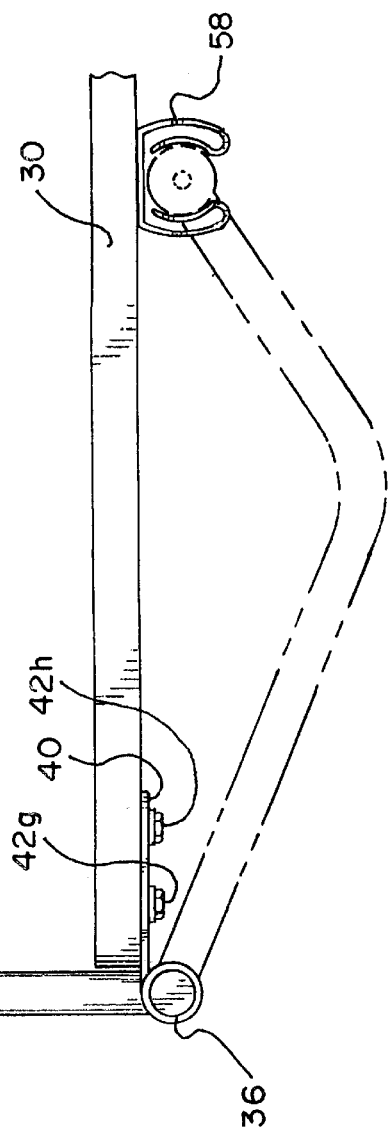
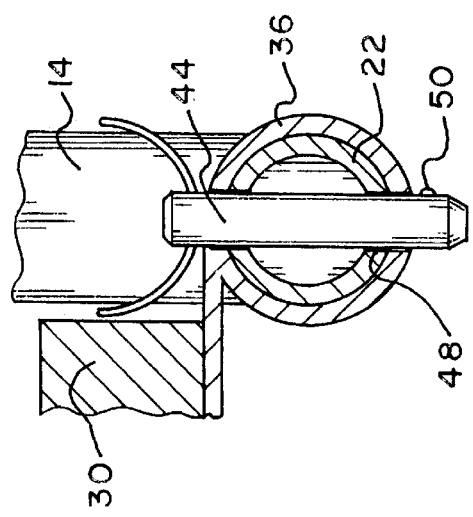
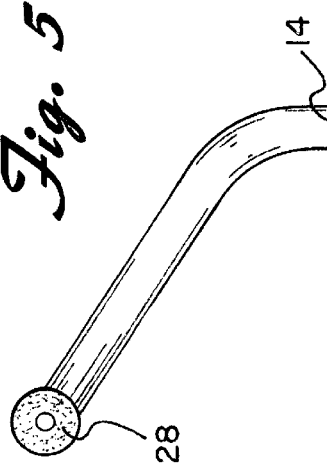

PIVOTAL HANDLE FOR A FOOD SERVICE TABLE

BACKGROUND OF THE INVENTION

The present invention is directed toward a handle and particularly, toward a handle for a wheeled food service table where the handle is pivotable between an operative and an inoperative position.

It is common practice in hotels, on cruise ships, and in other types of lodging where food is consumed by guests in a room separate from a dining room to serve food on a portable, wheeled table. The table serves not only as a mode of transportation for the food, but as a table upon which the food may be served and consumed.

Typically, these wheeled tables are equipped with at least one handle which is used by the server to push or pull the table. The handle, however, is often located at the same or close to the level of the top of the table. For example, U.S. Pat. No. 5,183,372 to Dinverno discloses a service cart where the handle is nearly level with the top of the cart. As a result, the server is forced to bend over in order to maneuver the table. This causes strain on the person's back and arms.

Also, as these tables are used as dining tables, it is not very aesthetically pleasing to have a handle protruding from one or more sides of the table.

Therefore, a need exists for a food service table with a handle which allows the server to maneuver the table in a comfortable and ergonomically correct manner. Also, a need exists for a functional yet aesthetically pleasing portable, wheeled table.

SUMMARY OF THE INVENTION

The present invention is designed to overcome the deficiencies of the prior art discussed above. It is an object of the present invention to provide a pivotal handle for a food service table which allows the table to be maneuvered easily and comfortably by a person.

It is another object of the present invention to provide a handle for a food service table which allows the table to be stored compactly.

It is a further object of the present invention to provide a pivotal handle for a food service table which allows the table to be aesthetically pleasing when the handle is not in use.

In accordance with the illustrative embodiments demonstrating features and advantages of the present invention, there is provided a pivotal handle for a food service table. The handle includes two elongated, parallel curved right and left bar members. Each member has an outwardly extending arm and an outwardly extending leg. The arm and leg of the right bar member extend outwardly to the right and the arm and leg of the left bar member extend outwardly to the left. Each of the arms has a gripping portion which a person using the handle grips in order to steer the table. The legs have means for pivotably attaching the handle to the underside of the table. In its operative position, the handle is pivoted upwardly so that the arms are located above the top of the table and are accessible. Locking means such as a quick release pin is inserted into an opening formed in the leg which locks the handle in place. When the table is ready to be used as a dining table or to be stored, the pin is removed so that the handle may now be rotated downwardly and stored under the table. Securing means may be attached to the underside of the table which secures the handle in place when the handle is in the stored position.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 3 illustrates the handle of the present invention in the operative position;

FIG. 4 illustrates the handle of the present invention in the inoperative position;

FIG. 5 is right side elevational view of the handle of the present invention; and FIG. 6 is a partial cross-sectional view taken through line 6—6 of FIG. 3.

DETAILED DESCRIPTION OF THE PREFERRED EMBODIMENT

Figure 2:
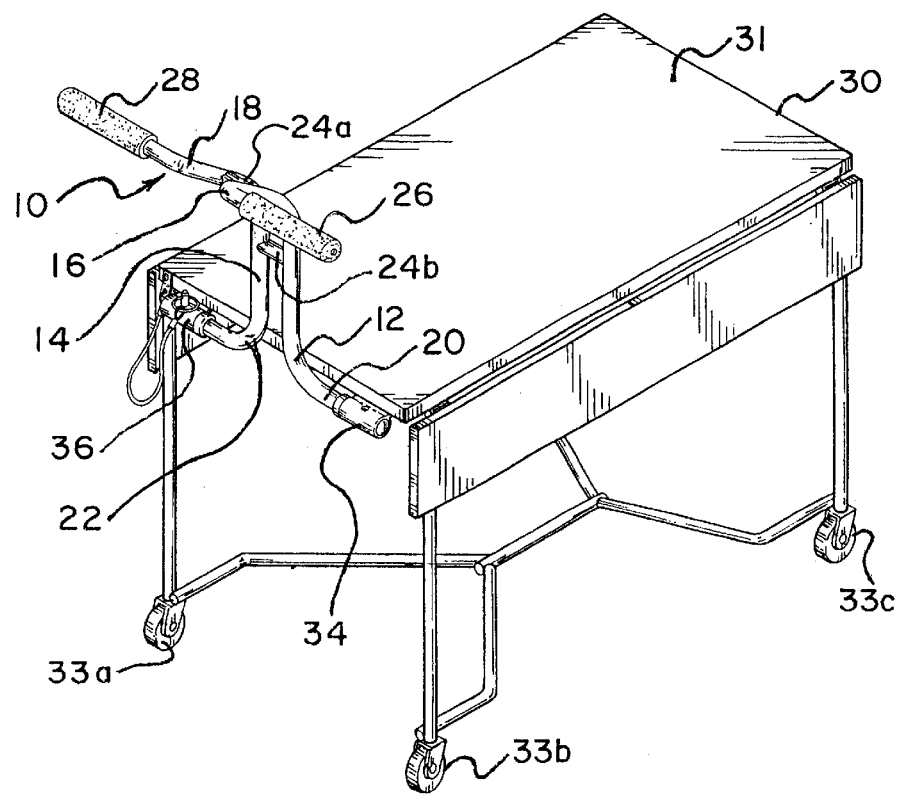
FIG. 2 is a front perspective view of the handle of the present invention attached to a food service table.

Referring now to the drawings in detail wherein like reference numerals have been used throughout the various figures to designate like elements, there is shown in FIG. 2 a pivotal handle constructed in accordance with the principles of the present invention and designated generally as 10.

The handle of the present invention includes two generally parallel elongated, curved right and left bar members 12 and 14, respectively. Each member 12 and 14 has an arm 16 and 18, respectively, which curves outwardly from the top of the bar member at a generally ninety degree angle. Arm 16 of right bar member 12 extends outwardly to the right and arm 18 of left bar member 14 extends outwardly to the left. Each member 12 and 14 also has a leg 20 and 22, respectively, which curves outwardly from the bottom of the bar member at a generally ninety degree angle. Leg 20 of right bar member 12 extends outwardly to the right and leg 22 of left bar member 14 extends outwardly to the left. The bar members 12 and 14 are connected or secured to each other via horizontal extensions 24a and 24b. Each of the arms 16 and 18 has a respective gripping portion 26 and 28 which a person using the handle grips in order to steer the table 30. The gripping portions may be made from foam, rubber, or similar material which allows a person to grasp the arms without losing his or her grip.

Each leg 20 and 22 has means for pivotably attaching the handle to the underside 32 of the table 30. Each of the attaching means is secured to the table adjacent an edge thereof (See FIG. 2.) The attaching means may include cylindrical sockets 34 and 36 though which legs 20 and 22, respectively, extend and plates 38 and 40 which are welded or otherwise permanently secured to their respective sockets 34 and 36. The plates 38 and 40 are secured to the underside 32 of the table 30 by bolting them, for example, to the underside 32 of the table 30 via bolts 42a–42h. Legs 20 and 22 fit securely within the sockets 34 and 36, respectively, yet may rotate therein as will be more 9 fully described below.

In its operative position, the handle is pivoted upwardly so that the arms 16 and 18 are located above the top surface 31 of the table 30 and are accessible. (See FIGS. 2 and 3.) Locking means such as quick release pins are inserted into respective openings formed in the sockets and legs. This is shown, for example, as pin 44, opening 46 in socket 36, and opening 48 in leg 22. (See FIGS. 4 and 6.) The pin 44 has a spring-loaded ball 50 which prevents the pin 44 from being withdrawn from the openings 46 and 48 unless significant force is being applied to the pin 44. (See FIG. 6.) Thus, the handle is prevented from moving. The pin 44 may include means for securing the same to the table 30. This is shown, for example, as a wire 52 attached to the pin 44 and to a plate 54 where the plate 54 is bolted to the table 30 via bolt 56. (See FIG. 3.) The server may now grasp the arms 16 and 18 and easily maneuver the table 30 which has a plurality of wheels 33a, 33b, and 33c attached to the underside 32 of the table 30 to the desired location without having to bend over.

Figure 1:
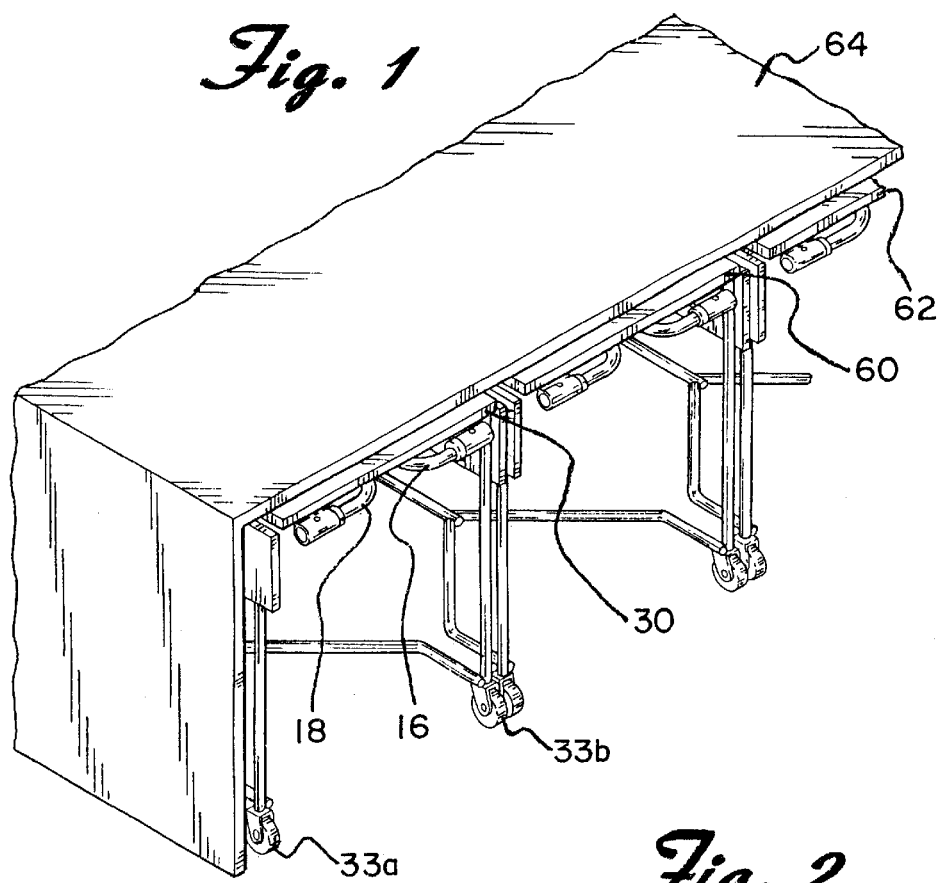
FIG. 1 illustrates a plurality of food service tables being stored where each table has a handle of the present invention attached thereto.

When the table 30 is ready to be used as a dining table or to be stored, the pin 44 is removed from the openings 46 and 48. The legs 20 and 22 are now free to rotate within the sockets 34 and 36, respectively. The handle is rotated downwardly and stored on the underside 32 of the table 30. (See FIG. 4.) That is, the attaching means allows the handle to rotate more than 180 degrees from the operative position above the top surface of the table to the inoperative position adjacent the underside of the table as shown in FIG. 5. Securing means may be attached to the underside 32 of the table 30 away from the attaching meant The securing means secures the handle in place. (See FIGS. 4 and 5.) Securing means may be a spring clip 58 or the other securing means well known and used in the art. While the spring clip 58 is shown to be gripping arm 18, it should be realized that either arm may be secured. The table may now be used as a dining table without the interference of the upwardly extending handle. Alternatively, a plurality of tables 30, 60, and 62 with a handle attached to each may be stored compactly under a counter 64 or the like. (See FIG. 1.)

The present invention may be embodied in other specific forms without departing from the spirit or essential attributes thereof and accordingly, reference should be made to the appended claims rather than to the foregoing specification as indicating the scope of the invention.

I claim:

1. The combination of a pivotal handle and a wheeled food service table comprising:
   a table having a top surface, an underside, and a plurality of wheels attached to said underside of said table;
   a handle;
   means for pivotably attaching said handle to said table, said means for attaching being secured to said table adjacent an edge thereof and said means for attaching allowing said handle to rotate more than 180 degrees from an operative position above said top surface of said table to an inoperative position adjacent said underside of said table;
   a spring clip located on said underside of said table away from said means for attaching, said clip adapted to secure said handle to said underside of said table in said inoperative position; and
   means for releasably locking said handle in said operative position.

2. The combination of claim 1 wherein said handle includes two elongated parallel right and left bar members said right bar member having a top end and a bottom end, said top end having an arm extending outwardly therefrom and said bottom end having a leg extending outwardly therefrom; said left bar member having a top end and a bottom end, said top end having an arm extending outwardly therefrom and said bottom end having a leg extending outwardly therefrom; and means for connecting said right and left bar members.

3. The combination of claim 2 wherein each of said arms has a gripping portion.

4. The combination of claim 2 wherein said means for locking includes an opening formed in at least one of said legs and a quick release pin with a spring loaded ball inserted therethrough.

5. The combination of claim 2 wherein said means for attaching includes a separate socket attached to each of said legs and a plate attached to each of said sockets, said legs rotatably extending through its respective socket and each of said plates also being attached to said underside of said able.

* * * * *

UNITED STATES PATENT AND TRADEMARK OFFICE
CERTIFICATE OF CORRECTION

PATENT NO.         : 6,802,525 B2                                    Page 1 of 1
APPLICATION NO. : 09/950535
DATED              : October 12, 2004
INVENTOR(S)       : Kenneth R. Smith It is certified that error appears in the above-identified patent and that said Letters Patent is hereby corrected as shown below:

| | |
|---|---|
| Col. 2, line 58 | "though which legs" should read --through which legs-- |
| Col. 2, line 65 | "more 9 fully described" should read --more fully described-- |
| Col. 3, line 28 | "meant The" should read --means. The-- |
| Claim 5, col. 4, line 41 | "of said able." should read --of said table.-- |

Signed and Sealed this

Eighth Day of May, 2007

JON W. DUDAS
*Director of the United States Patent and Trademark Office*